Figure 1:
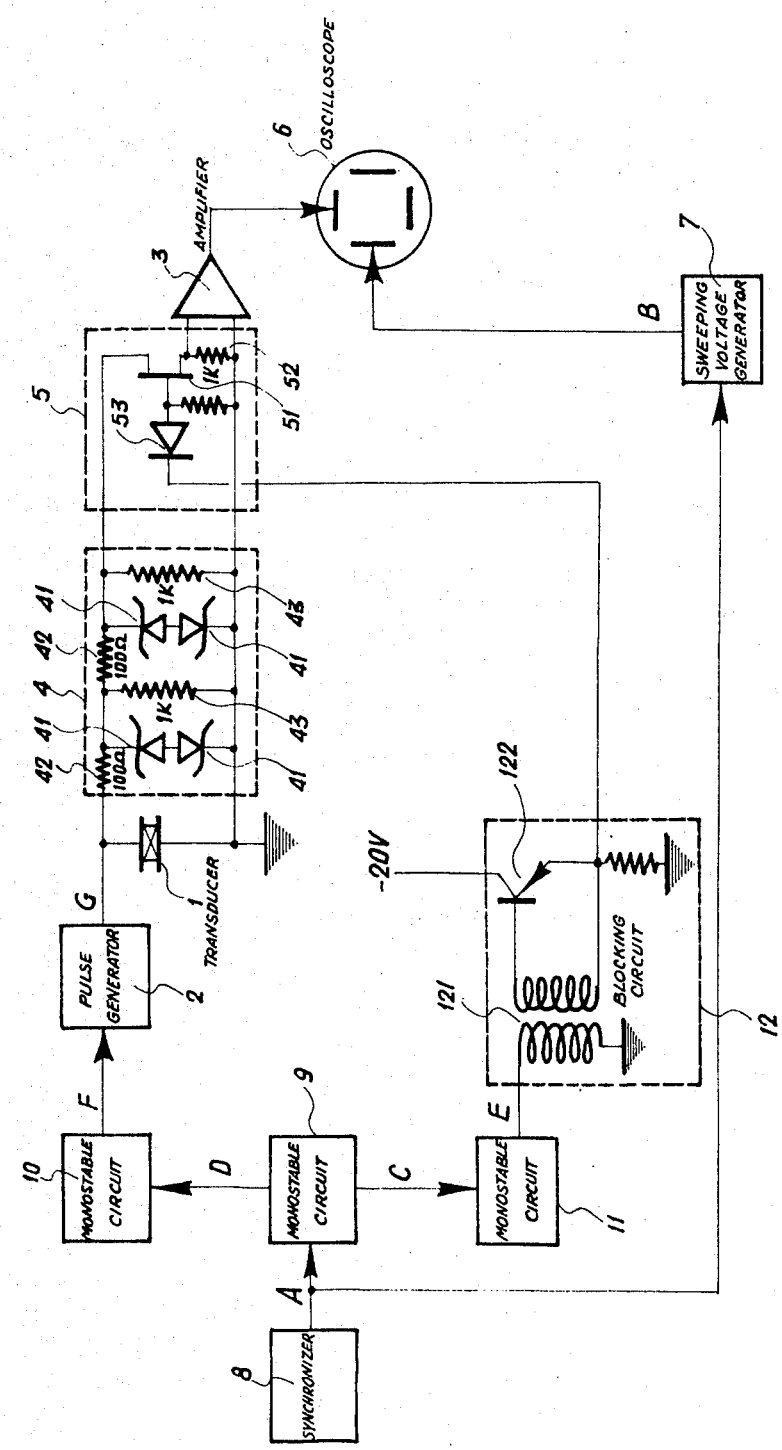

United States Patent [19]
Donnadieu

[11] 3,738,159
[45] June 12, 1973

[54] TESTING DEVICE FOR INSPECTING AN OBJECT

[75] Inventor: Henry Donnadieu, Le Pecq, France

[73] Assignee: Institut De Recherches De La Siderurgie Francaise, St. Germain-en-Laye, France

[22] Filed: Aug. 25, 1971

[21] Appl. No.: 174,814

[30] Foreign Application Priority Data
Sept. 2, 1970 France .............................. 7031907

[52] U.S. Cl. .............................................. 73/67.9
[51] Int. Cl. ............................................ G01n 29/04
[58] Field of Search ....................... 73/67.8 R, 67.9

[56] References Cited
UNITED STATES PATENTS
2,549,895  4/1951  De Lano, Jr. ........................ 73/67.9
3,285,059  11/1966  Bogle ................................... 73/67.9
3,245,251  4/1966  Ardenne ............................... 73/67.9

Primary Examiner—James J. Gill
Attorney—Kurt Kelman

[57] ABSTRACT

The pulses of electrical energy adapted to excite an electromechanical transducer used to inspect an object are blocked on their way to the amplifier by a commutation circuit comprising a commutation stage and capable of selectively transmitting and blocking the signals, and a control circuit producing a signal blocking pulse at least during the duration of the transducer exciting pulses, which blocking pulse is applied to the commutation stage.

2 Claims, 2 Drawing Figures

TESTING DEVICE FOR INSPECTING AN OBJECT

The present invention relates to improvements in a testing device for inspecting an object, and more particularly ultrasonic inspection systems for searching and finding faults in an object by detecting echo pulses emanating therefrom.

Known devices of this type comprises a pulse generator having an output emitting recurrent high-energy pulses or bursts of pulses, an electromechanical transducer, usually a piezo-electric crystal, and an electric connection between the generator and the transducer for applying the bursts of electric pulses thereto to shock excite the transducer. The electromechanical transducer converts the exciting pulses into mechanical energy, i.e., ultrasonic waves, transmits the mechanical energy into the object, which is suitably coupled to the transducer by a coupling medium, for instance water, receives reflected or echo mechanical energy from the object, and transforms the echo mechanical energy into corresponding electric echo signals. The reflection of the propagated waves in the object occurs at discontinuities or obstacles, i.e., faults, in the object. An electric connection between the transducer and a signal amplifier transmits the electric echo signals to the amplifier input, substantial signal amplification being required because the echo signals are usually too weak to be used in an oscilloscope indicating the location of the faults in the object.

To give an indication of the usual magnitudes involved, the echo signals are of the order of millivolts while the exciting pulses are often of the order of 1,000 V, crest-to-crest. The exciting pulses are applied to the input of the amplifier of the echo signals, which necessitates the provision of a protective circuit for the amplifier, for instance a clipping circuit. However, such protective circuits result in considerable distortions, a notable loss of amplitude of the signals, and delays at the amplifier of the order of a few up to 12 microseconds for recovering its normal characteristics after the surcharge has disappeared from the amplifier input. It is well known that this phenomenon makes inspection or testing of the space very close to the transducer impossible. While many efforts have been made to overcome this difficulty, none up to now has been fully effective.

It is the primary object of this invention completely to eliminate these phenomena of saturation or "dazzle" of the amplifier by the exciting pulses and to permit a perfectly correct reception of the echo signals.

The above and other objects are accomplished in accordance with the invention by providing a blocking means for the electric signals in the electric connection between the transducer and the amplifier, which means includes a commutation circuit or switching circuit comprising a commutation (switching) stage and capable of selectively transmitting the echo signals coming from the transducer and blocking the signals transmitted from pulse generator, a control circuit producing a signal blocking pulse at least during the duration of each recurrent exciting pulses, and an electric connection for applying the signal blocking pulse to the commutation stage for blocking the signals transmitted from pulse generator.

The "dazzle" of the signal amplifier is very disadvantageous in the much utilized inspection units using a single transducer for alternatively emitting ultrasonic waves into the object and receiving echo waves therefrom. It practically results in total paralysis of the amplification during a given time after the exciting pulse, this time-lag depending on the amplitude of the exciting pulse and the capacity of recovery of the amplifier. Up to date, all efforts went primarily in the direction of imparting such characteristics to the amplifier that it resists the periodic surcharge and "recovers" rapidly after its disappearance but it was not possible to lower the "dazzle" time to less than a few microseconds, which is still too long.

The invention is based on a different approach, i.e., to suppress the very cause of the amplifier "dazzle" by briefly interrupting the transmission of signal to the amplifier during, and only during, the excitation of the transducer. In this way, the amplifier input is not saturated by the exciting pulses and is in a condition to amplify correctly the smallest echo signals arriving as soon as the transmission thereof has been restored, i.e., at the end of the exciting pulse, if desired.

To this end, a commutation circuit or switching circuit has been provided between the electromechanic transducer and the amplifier input, this switching circuit having two strongly differentiated states of information conduction. This commutation circuit is controlled by a blocking signal, for instance a blocking pulse, so that the circuit becomes non-conductive for the duration of the exciting pulse or, at least, for the entire time during which this pulse presents an amplitude capable of "dazzling" the amplifier. To make certain that the commutation circuit is blocked before the exciting pulse arrives, a preferred embodiment of the invention provides a synchronizing system which triggers the exciting pulse generator for the transducer with a certain delay in respect of the blocking of the commutation circuit. This delay and the duration of the blocking may be obtained in a conventional manner with monostable (one-shot) multi-vibrators which are triggered by recurrent pulses delivered from a synchronizer which determines the frequency of the exciting pulses.

A particularly useful commutation device or switching element is a field effect transistor which lends itself well to signal transmission without any substantially signal weakening or to almost complete blocking of signals. However, the problem becomes difficult to solve in many cases where the echo signals are very weak, for instance a few millivolts, despite an exciting pulse of large amplitude, for instance 600 V crest-to-crest. This is particularly the case in ultrasonic testing of metallic objects at high temperatures, which require exciting pulses of great power and return only very weak echo signals because the rigidity of the objects is reduced due to their high temperature and the absorption of mechanical energy, i.e., ultrasonic waves, therein is correspondingly increased. Commutation devices representing a sufficiently high commutation speed and capable of resisting tensions exceeding several tens of volts, for instance 30 V, are hardly known.

For the case where the amplitude of the exciting pulses exceeds several tens of volts, a particularly advantageous embodiment of the present invention provides a clipping stage preceding the commutation stage to limit the maximum amplitude of the signals received by the commutation stage. In the preferred embodiment, use is made of the properties of certain "Zener" diodes capable of sustaining voltages up to 1,200 V with Zener voltage in the neighborhood of 10 V, having turn-on-time (response time to clamping action) of the order of a picosecond, which is much less than the time of the rise of the exciting pulse, a very low junction capacity and a very high resistance when non-conductive. Such diodes permit the exciting pulse to be clipped most effectively to the level of the Zener voltage without weakening the useful signals of an amplitude much lower than the Zener voltage. This is a considerable advantage over the presently used junction diodes used for clipping in ultrasonic testing circuits.

Since the pulses at the transducer terminals are usually in the form of a high-frequency oscillation, the voltage signal is alternating. Therefore, the clipping should be symmetric. To this end, the Zener diodes are disposed in opposing pairs, i.e., in series with opposed poles.

It should be noted that clipping of the pulses in itself is not enough to obtain the desired results since such clipping can be done only at the level of a few volts,- which is still too high a voltage to avoid "dazzling" the amplifier.

Figure 2:
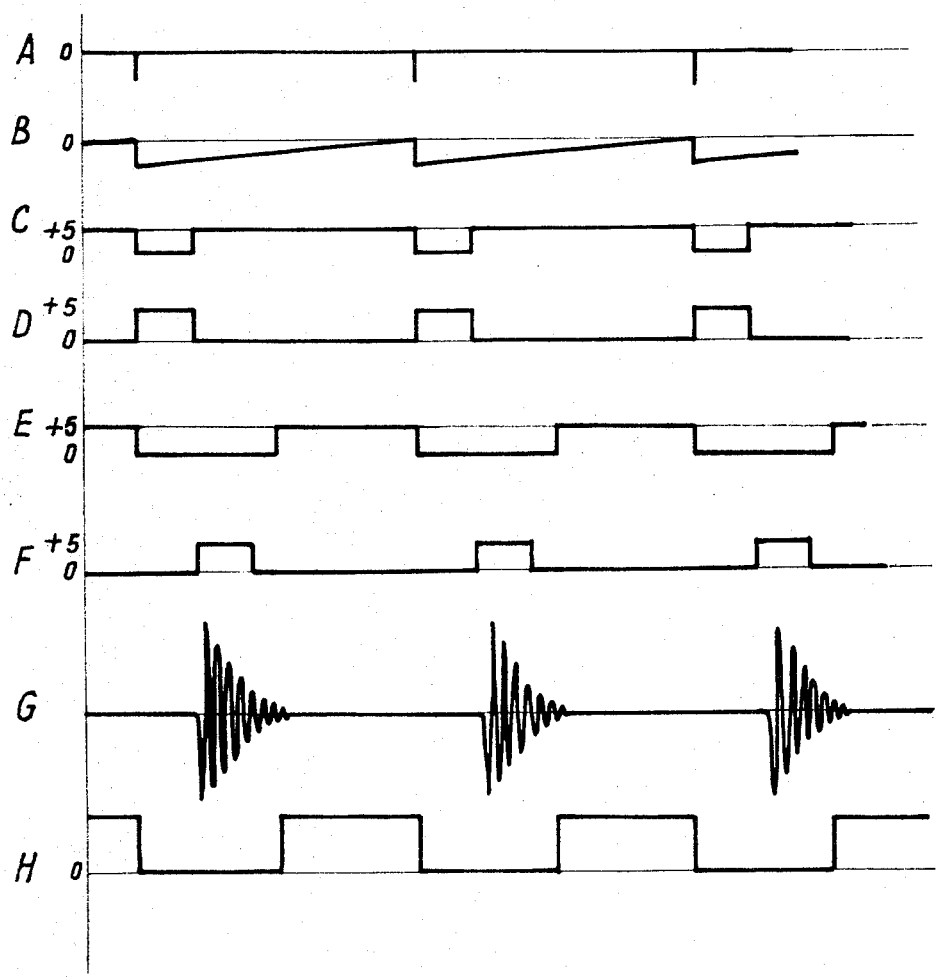

The above and other objects, advantages and features of the present invention will be more fully understood by reference to the following detailed description of a now preferred embodiment thereof, taken in conjunction with the accompanying drawing wherein :

FIG. 1 is a circuit diagram of an apparatus embodying the principles of this invention ; and FIG. 2 is a diagram illustrating the voltages as a function of the time delays at different points of the circuit.

The invention has been illustrated and will be specifically described in connection with an otherwise conventional ultrasonic inspection device. As is well known, such a device includes an electromechanical transducer including a piezo-electric element 1, for instance a barium titanate crystal. The transducer is adapted to be excited electrically by excitation generator 2 (power pulse generator) in order that the crystal may periodically transmit mechanical pulses of limited duration into a test piece to be inspected. The excitation or power pulse generator may be of conventional design including a thyristor, such as described in French Pat. No. 1,525,998. The mechanical pulses or waves will travel into the test piece through an entering surface thereof and, upon striking a reflecting surface, such as a defect within the test piece, will be reflected back to the crystal to generate an audio-signal in the form of a voltage. The time interval between the transmission and the reception of the pulse reflection or echo gives an indication of the location of the defect.

The excitation generator is triggered 1,000 times per second, in a manner to be described hereinafter.

The terminals of the piezo-electric crystal receive the exciting pulses from the excitation generator and transmit the signals corresponding to the echos from the test piece. These signals are transmitted to amplifier 3 through clipping stage 4 and switching stage (commutation) 5 will be described in detail hereinafter. The output of the amplifier is applied in a well known manner to the vertical plates of cathode-ray oscilloscope 6, whose horizontal plates receive a saw-tooth sweeping voltage applied from sweeping voltage generator 7 which is triggered in synchronism with the triggereing of the power pulse generator 2. The circuit is operated by a synchronizer or timer (clock) 8 which emits pulses recurring 1,000 times per second. The timer pulses simultaneously a monostable circuit 9 and the sweeping voltage generator 7. In turn, the circuit 9 triggers two other monostable or delay circuits 10 and 11 which respectively control the excitation generator 2 and the signal blocking control circuit 12 which generates the blocking pulse for the commutation stage 5. Thus, when the synchronizer (clock) 8 periodically energizes sweep circuit 7 controlling the sweep between the horizontal plates of the oscilloscope, it will also energize the circuit leading to amplifier 3 which, after a delay given by circuit 11, receives the echo signals from piezo-electric crystal 1 to cause vertical deflection of the sweep in response to the signal voltages on crystal 1. Delay circuits 9, 10 and 11 may be conventional monostable (one-shot) multi-vibrators.

The particular circuits of the present invention will now be described in detail.

The clipping stage 4 comprises two clipping devices 41, 41 connected in series and each equipped with two diodes of the "Zener" type connected in opposed series, diodes of the type 1N5556 being used for the first cell and of the type GZ00315 for the second cell. These diodes, which may take inverse voltages of 1,200 volts, have a very weak junction capacity and a turn-on time of less than a picosecond from the time of rest, i.e., when no direct current flows therethrough. The turn-on time is longer when this condition does not exist. Therefore, a regular diode may be arranged in series with a Zener diode of this type if great speed is to be assured. In the present case, the turn-on time, expressed in nanoseconds, would be large enough in respect of the rise time of the exciting pulses and, therefore, this precaution is not used. Two Zener diodes have been utilized in the described opposed series connection to obtain symmetric clipping in a simple manner. This arrangement has the added advantage that it assures a very low dynamic impedance necessary for perfect clipping of the exciting pulses whose power is very important. Ordinary junction diodes or even rapid commutation diodes would constitute a higher dynamic impedance. Each clipping device is completed by resistances 42 and 43. The clipping voltage ranges between 6 V and 10 V, equal to the voltage of the particular diodes GZ00315. The signals of a lower amplitude are attenuated solely by the divider formed by the resistances 42, 43, i.e., in the present case about 2 db.

The commutation stage 5 is constituted essentially by a field effect transistor 51 of the type 2N3824 which directly receives the signals transmitted by the clipping stage 4 and restores them practically without substantial weakening at the terminals of resistance 52 when the transistor is conductive. In this state, the internal resistance of the transistor is only of the order of 250 ohms. It may be brought to the blocking state, where its internal resistance is several megohms, by a blocking pulse applied to its gate by the blocking circuit 12, a diode 53 being interposed between the blocking circuit and the transistor to fix the polarity of the blocking pulse. In the blocked state, the signal received from clipping stage is weakened very materially, in excess of 40 db.

The blocking circuit 12 comprises simply a pulse transformer 121 and an impedance transistor 122 so as to deliver the blocking pulse at a rather low impedance compared to the signals delivered by delay circuit 11 in a known manner.

Since the delay circuits 9, 10 and 11 are well known, they require no description. The same holds true for the synchronizer or timer 8 which generates recurring actuating pulses. Any suitable devices well known to those skilled in the art may be used.

The operation of the ultrasonic testing device will now be explained with reference to FIG. 2 where the signals appearing at different points in the circuit have been indicated. These points have been indicated in capital letters in the circuit diagram of FIG. 1, with the corresponding letters appearing in FIG. 2.

At A, the synchronizer 8 delivers a train of recurrent negative operating pulses of 5 V at their crest, the frequency of the pulses being 1,000/second. These operating pulses trigger the sweeping voltage generator 7 which produces the saw-tooth sweep voltage at B for sweeping the oscilloscope tube 6. At the same time, the operating pulses trigger the one-shot multivibrator 9 whose normal period is abour 2 microseconds. This is the duration of the delay before the triggering of the pulse generator 2 which permits to make certain that the field effect transistor 51 is effectively cut off when the exciting pulse appears. This delay does not seriously reduce the testing possibilities between two successive pulses. The one-shot multivibrator 9 has two complementary output terminals. The potential of the output terminal C passes from + 5 V to 0 during the operation of the multivibrator 9 and delivers the negative signal, and the potential of terminal D passes from 0 to + 5 V during the same period and delivers a positive signal. The signal from terminal C is applied to delay circuit 11, which may be triggered only by a negative pulse and which is, therefore, triggered by the leading edge of the signal C, i.e., practically coincidentally with pulse A. The period of operation of the one-shot multivibrator 11 may be adjusted between 1.5 to 10 microseconds, which is the blocking time of commutation stage 5 and which is adjusted experimentally to a suitable value required to suppress the overload of amplifier 3. The pulse E delivered by delay circuit 11 is applied to transistor 122 through circuit 12 described hereinabove.

The positive signal D is applied to monostable circuit 10 which also can be triggered only by a negative pulse, i.e., which is triggered only by the rear edge of signal D with a delay of 2 microseconds. The monostable unit 10 delivers a positive signal F of a duration of about 2 microseconds to pulse generator 2 to trigger the same in a manner known per se. Thus, the exciting pulses G from generator 2 can be produced only during the time H of non-conduction of the transistor. Control of the duration of the blocking of the transistor permits the connection to the amplifier to be reestablished as soon as the oscillation no longer as an obstructive value.

It will be noted that the monostable multivibrator 9 determines the delay time of the excitation of the transducer 1 and that the monostable multivibrator 11 determines the blocking time of the transmission of the echo signals to the amplifier. The operational period of the monostable multi-vibrator 10 plays no role in the determination of the operation. Its role is primarily that of separating the triggering circuits of the thyristor generator 2 and of the blocking circuit 12 so as to avoid any interference therebetween.

The described system permits an exciting pulse of 600 V crest-to-crest, and of 3 microseconds duration to be brought down to a value of less than 50 mV at the input of amplifier 3. Even much more effective weakening of the high energy exciting pulses down to amplitudes of less than 1 mV may be obtained by disposing a second commutating transistor in series with the first one, the second transistor being similarly blocked by a blocking pulse applied to its gate. The useful echo signals are not further weakened because it is possible to select for the second commutator a transistor with a resistance of a few ohms only in the state of conduction.

While the invention has been described in connection with a now preferred embodiment, it will be clearly understood that many modifications and variations may occur to those skilled in the art, particularly after benefiting from the present teaching, without departing from the spirit and scope of this invention as defined in the appended claims.

I claim:

1. In a supersonic testing system for inspecting an object: means for generating recurrent high-energy exciting pulses, an electromechanical transducer, an electric connection between the generator and the transducer for applying the exciting pulses thereto, the electromechanical transducer converting the exciting pulses into mechanical energy, transmitting the mechanical energy into the object, receiving reflected or echo mechanical energy from the object, and transforming the echo mechanical energy into corresponding electric echo signals, an echo signal amplifier having an input, an electric connection between the transducer and the amplifier for transmitting the electric echo signals to the amplifier input, and blocking means for preventing the exciting pulses from passing through the amplifier, said blocking means including a clipping stageconnected in parallel with the transducer and comprising at least one pair of Zener diodes having a turn-on time shorter than the rise time of the exciting pulse, the diodes of said pair being connected in opposed series, a commutation stage comprising at least one field effect transistor, said commutation stage being connected between the clipping stage and the amplifier, and a control circuit applying to the field effect transistor of the commutation stage a blocking pulse during the duration of the exciting pulse and leaving it in a conductive state the rest of the time.

2. In the testing system of claim 1, a synchronizer system for the exciting pulse generating means and the blocking means, which system comprises a generator of recurrent operating pulses for synchronizing the operation of the pulse generating means and the blocking means, a first delay circuit producing at each recurrent operating pulse the blocking signal pulse, the duration of the blocking signal pulse being adjustable, and a second delay circuit producing at each recurrent operating pulse a delay signal for the exciting pulse generating means, the duration of the delay signal being shorter than that of the signal blocking pulse.

* * * * *